United States Patent [19]

Kashihara et al.

[11] Patent Number: 5,291,804
[45] Date of Patent: Mar. 8, 1994

[54] APPARATUS FOR CONTROLLING LINE PRESSURE FOR AUTOMATIC TRANSMISSION UPON VEHICLE STARTING WITH THE TRANSMISSION PLACED IN SECOND OR HIGHER-GEAR POSITION

[75] Inventors: Yuji Kashihara, Toyota; Shinya Nakamura, Owariasahi, both of Japan

[73] Assignee: Toyota Jidosha Kabushiki Kaisha, Toyota, Japan

[21] Appl. No.: 978,515

[22] Filed: Nov. 18, 1992

[30] Foreign Application Priority Data

Nov. 18, 1991 [JP] Japan .................... 3-329467

[51] Int. Cl.⁵ ............................ B60K 41/04
[52] U.S. Cl. ............................ 74/867; 74/868; 192/109 F
[58] Field of Search .............. 74/867, 868, 869; 192/109 F

[56] References Cited

U.S. PATENT DOCUMENTS

| 2,995,957 | 8/1961 | Wilson et al. |
|---|---|---|
| 3,495,481 | 2/1970 | Ohie et al. |
| 3,543,610 | 12/1970 | Kogaki. |
| 3,710,649 | 1/1973 | Kubo. |
| 4,539,870 | 9/1985 | Sugano .................... 192/109 F X |

FOREIGN PATENT DOCUMENTS 49-108472 10/1974 Japan.
61-256047 11/1986 Japan.

OTHER PUBLICATIONS

Toyota Corona, New Car Features, Aug. 1985, pp. 4–50 and 4–51.
Fundamentals of Automatic Transmissions, Service Training Information, Toyota Motor Corporation, 1988, pp. 73–75.

Primary Examiner—Allan D. Herrmann
Attorney, Agent, or Firm—Oblon, Spivak, McClelland, Maier & Neustadt

[57] ABSTRACT

Apparatus including a pressure regulating valve for regulating line pressure for hydraulically operated frictional coupling devices of a vehicle automatic transmission, and a cut-back valve for causing the pressure regulating valve to raise the line pressure to a higher level when the transmission is placed in first-speed position, than the normal level established when the transmission is placed in any higher-gear position whose speed reduction ratio is lower than that of the first-speed position. A pressure applying device is provided to apply to the cut-back valve first and second pressures to be applied to respective two coupling devices to establish a higher-gear position of the transmission, to operate the cut-back valve for causing the pressure regulating valve to raise the line pressure to the higher level when the vehicle is started in a high-gear start mode with the transmission placed in the higher-gear position.

9 Claims, 6 Drawing Sheets

FIG. 2

| | $B_0$ | $F_0$ | $C_0$ | $F_2$ | $B_3$ | $F_1$ | $B_2$ | $B_1$ | $C_2$ | $C_1$ | SOLENOIDS No.1 | SOLENOIDS No.2 | TRANSMISSION POSITIONS | SHIFT LEVER POSITIONS |
|---|---|---|---|---|---|---|---|---|---|---|---|---|---|---|
| | | | ○ | | | | | | | | ⊗ | ⊗ | P | P |
| | | | ○ | | ○ | | | | ○ | | ⊗ | ⊗ | R | R |
| | | | ○ | | | | | | | | ⊗ | ⊗ | N | N |
| | | ○ | ○ | ○ | | ○ | ○ | | | ○ | ○ | × | 1st | D |
| | | ○ | ○ | | | | ○ | | | ○ | ○ | ○ | 2nd | D |
| | | ○ | ○ | | | | ○ | | ○ | ○ | × | ○ | 3rd | D |
| | ○ | | | | | | | | ○ | ○ | × | × | O/D | D |
| | | ○ | ○ | ○ | | ○ | ○ | | | ○ | ○ | × | 1st | S |
| | | ○ | ○ | | | | ○ | ○ | | ○ | ○ | ○ | 2nd | S |
| | | ○ | ○ | ○ | ○ | | | | ○ | ○ | × | ○ | 3rd | S |
| | | ○ | ○ | | | | | | | ○ | ○ | × | 1st | L |
| | | ○ | ○ | ○ | ○ | ○ | ○ | ○ | | ○ | ○ | ○ | 2nd | L |

APPARATUS FOR CONTROLLING LINE PRESSURE FOR AUTOMATIC TRANSMISSION UPON VEHICLE STARTING WITH THE TRANSMISSION PLACED IN SECOND OR HIGHER-GEAR POSITION

BACKGROUND OF THE INVENTION

1. Field of the Invention

The present invention relates to a hydraulic control apparatus for an automatic transmission of a motor vehicle.

2. Discussion of the Prior Art

There is known a hydraulic control apparatus for an automatic transmission of a motor vehicle having a plurality of hydraulically operated frictional coupling devices which are selectively activated for selectively establishing a first-speed position and at least one higher-gear position whose speed reduction ratio is lower than that of said first-speed position. This hydraulic control apparatus includes a pressure regulating valve for regulating a line pressure of a working fluid to be applied to the hydraulically operated frictional coupling devices, and a cut-back valve which has a first position and a second position. The cut-back valve is placed in the first position when the transmission is placed in the first-speed position, and is placed in the second position when the transmission is placed in any higher-gear position. In the first position, the cut-back valve causes the pressure regulating valve to raise the line pressure by a predetermined amount to a higher level from a normal level as normally established by the pressure regulating valve. In the second position, the cut-back valve causes the pressure regulating valve to regulate the line pressure to the normal level. An example of such hydraulic control apparatus is disclosed on pages 73-75 of "Fundamentals of AUTOMATIC TRANSMISSIONS, Service Training Information" published as Pub. No. ST1009E in 1988 by the assignee of the present application, and on pages 4-50 and 4-51 of "TOYOTA CORONA, New Car Features" published in August, 1985 by the assignee.

When a motor vehicle equipped with such automatic transmission is started on a road surface having a low coefficient of friction such as a snow-covered or frozen road surface, it is desirable to start the vehicle with the automatic transmission placed in a higher-gear position such as the second-speed position whose speed reduction ratio is next lower than that of the first-speed position, so as to reduce the tendency of slipping of the drive wheels on the road surface. If the automatic transmission is controlled by the hydraulic control apparatus of the type described above, however, the line pressure generated by the pressure regulating valve is not increased upon starting of the vehicle, since the second-speed position is selected. In this case, therefore, the torque transmitting capacity of the frictional coupling devices is insufficient for starting the vehicle with a sufficient drive force transmitted to the drive wheels.

Although the above drawback may be solved by using the frictional coupling devices which torque transmitting capacity is increased by increasing number of friction members of the coupling devices, this solution unfavorably results in increasing the size of the transmission.

In view of the above drawback, the present inventors developed a hydraulic control apparatus which has mode selecting means for selecting a high-gear start mode in which the vehicle is started with the automatic transmission placed in a predetermined one higher-gear position such as the second-speed position, and pressure applying means, responsive to the mode selecting means, for applying to the cut-back valve a first and a second pressure to be applied to respective two coupling devices of the transmission to establish the predetermined one higher-gear position, for placing the cut-back valve in the first position to raise the line pressure to the higher level when the transmission is shifted to the predetermined higher-gear position upon starting of the vehicle in the high-gear start mode. For instance, the high-gear start mode is established when the vehicle is started with the shift lever placed in a second-range position (S), rather than in a drive-range position (D) and when a suitable high-gear start switch is turned on. The number of the forward drive gear positions available with the shift lever in the second-range position is smaller than that available with the shift lever in the drive-range position.

The above hydraulic control apparatus assures sufficient torque transmitting capacity of the frictional coupling devices when the vehicle is started in the high-gear start mode. However, the above arrangement causes the line pressure to be raised to the higher level even when the transmission is shifted up to the higher-gear position (e.g., second-speed position) while the shift lever is placed in the second-range position, but while the high-gear start switch is off. In this case, therefore, the transmission suffers from a shifting shock upon engagement of the appropriate frictional coupling devices with relatively high hydraulic pressure due to the rise of the line pressure to the higher level, while the vehicle is running with the shift lever placed in the second-range position.

To solve the above problem, it is required to control the back pressures of the appropriate frictional coupling devices, in order to smoothly raise the hydraulic pressure for engagement of the coupling devices, when the transmission is shifted up to the higher-gear position while the vehicle is running with the shift lever placed in the second-range mode, and with the high-gear start switch in the off position. This solution, however, results in increasing the cost of the apparatus, because it requires suitable means for controlling the accumulator back pressures.

SUMMARY OF THE INVENTION

It is therefore an object of this invention to provide a hydraulic control apparatus for an automatic transmission of a motor vehicle, which apparatus is economical to manufacture, and permits the frictional coupling devices to have sufficiently large torque transmitting capacity upon starting of the vehicle in the high-gear start mode with the transmission placed in a higher-gear position, without increasing the number of friction members of the frictional coupling devices, and without suffering from a shifting shock of the transmission when the transmission is shifted up to the higher-gear position while the vehicle is running.

The above object may be accomplished according to the principle of the present invention, which provides a hydraulic control apparatus for an automatic transmission of a motor vehicle having a plurality of hydraulically operated frictional coupling devices for selectively establishing a first-speed position and at least one higher-speed position whose speed reduction ratio is lower than that of the first-speed position, the apparatus comprising: (a) a pressure regulating valve for regulating a line pressure of a working fluid to be applied to the hydraulically operated frictional coupling devices; (b) a cut-back valve having a first position selected when the transmission is placed in the first-speed position, and a second position selected when the transmission is placed in any one of the at least one higher-gear position, the cut-back valve when placed in the first position causing the pressure regulating valve to raise the line pressure by a predetermined amount to a higher level than a normal level as normally established by the pressure regulating valve, the cut-back valve when placed in the second position causing the pressure regulating valve to regulate the line pressure to the normal level; (c) mode selecting means for selecting a high-gear start mode in which the vehicle is started with the automatic transmission placed in a predetermined one of the at least one higher-gear position; and (d) pressure applying means, responsive to the mode selecting means, for applying to the cut-back valve a first and a second pressure to be applied to respective two coupling devices of the plurality of frictional coupling devices to establish the predetermined one higher-gear position, for placing the cut-back valve in the first position to raise the line pressure to the higher level, the hydraulic control apparatus being characterized in that the pressure applying means comprises first pressure applying means for applying the first pressure as a high-gear start pressure to the cut-back valve, and second pressure applying means for applying the second pressure to the cut-back valve. The first pressure applying means includes delay means for delaying the application of the first pressure to the cut-back valve, with respect to the application of the second pressure, for first applying only the second pressure to the cut-back valve to place the cut-back valve in the second position for lowering the line pressure from the higher level to the normal level, and then also applying the high-gear start pressure to the cut-back valve to place the cut-back valve in the first position for raising the line pressure to the higher level.

According to the hydraulic control apparatus of the present invention constructed as described above, the first and second pressures are applied to the cut-back pressure when the transmission is shifted to the predetermined higher-gear position such as the second-speed position, upon selection of the high-gear start mode. Therefore, the cut-back valve is placed in the first position when the vehicle is started in the high-gear start mode with the transmission placed in the predetermined higher-gear position. Accordingly, when the vehicle is started in the high-gear start mode, the line pressure regulated by the pressure regulating valve is raised to the higher level, which is higher by the predetermined amount than the normal level which is established when the transmission is placed in the other higher-gear position or positions whose speed reduction ratio is higher than that of the predetermined higher-gear position. Thus, the torque transmitting capacity of the frictional coupling devices activated for the predetermined higher-gear position is accordingly increased to assure a sufficient drive force for starting the vehicle with the transmission placed in the predetermined higher-gear position.

Further, the present hydraulic control apparatus is free from a shifting shock of the transmission when the transmission is shifted to the higher-gear position from the first-speed position while the vehicle is running, that is, when the transmission is shifted up to the higher-gear position, while the vehicle is not in the high-gear start mode. More specifically, the delay means delays the application of the first pressure to the cut-back valve, with respect to the application of the second pressure. Accordingly, only the second pressure applied to one of the two relevant coupling devices to establish the higher-gear position is applied to the cut-back valve to lower the line pressure from the higher level down to the lower level. Then, the first pressure applied to the other of the two coupling devices is applied as the high-gear start pressure to the cut-back valve, to thereby raise the line pressure to the higher level. In this respect, it is noted that before the transmission is shifted up to the higher-gear position, the line pressure is at the higher level. If the transmission is shifted to the higher-gear position while the vehicle (not in the high-gear start mode) is running, the line pressure is first lowered to the normal level to avoid a shifting shock, and then the line pressure is raised to the higher level.

The predetermined higher-gear position is preferably a second-speed position whose speed reduction ratio is next lower than that of the first-speed position.

The mode selecting means may comprise a shift lever having a drive position and a second position, and the at least one higher-gear position consists of a plurality of higher-gear positions which are automatically selectable when the shift lever is placed in the drive position. When the shift lever is placed in the second position, at least one of the plurality of higher-gear positions which includes a higher-gear position (2nd) whose speed reduction ratio is next lower than that of the first-speed position is automatically selectable. The higher-gear start mode is selected when the shift lever is placed in the second position. In this case, too, the predetermined higher-gear position is preferably the higher-gear position whose speed reduction ratio is next lower than that of the first-speed position.

The mode selecting means may further comprise a mode selector switch which is operated to select the high-gear start mode while the shift lever is placed in the second position. In this case, the transmission is shifted to the predetermined higher-gear position when the mode selector switch is operated while the shift lever is placed in the second position.

BRIEF DESCRIPTION OF THE DRAWINGS

The above and optional objects, features and advantages of the present invention will become more apparent by reading the following detailed description of a presently preferred embodiment of the invention, when considered in connection with the accompanying drawings, in which:

FIG. 2 is a view indicating operating states of solenoids and clutches and brakes in relation to operating positions of the transmission;

DETAILED DESCRIPTION OF THE PREFERRED EMBODIMENTS

Figure 1:
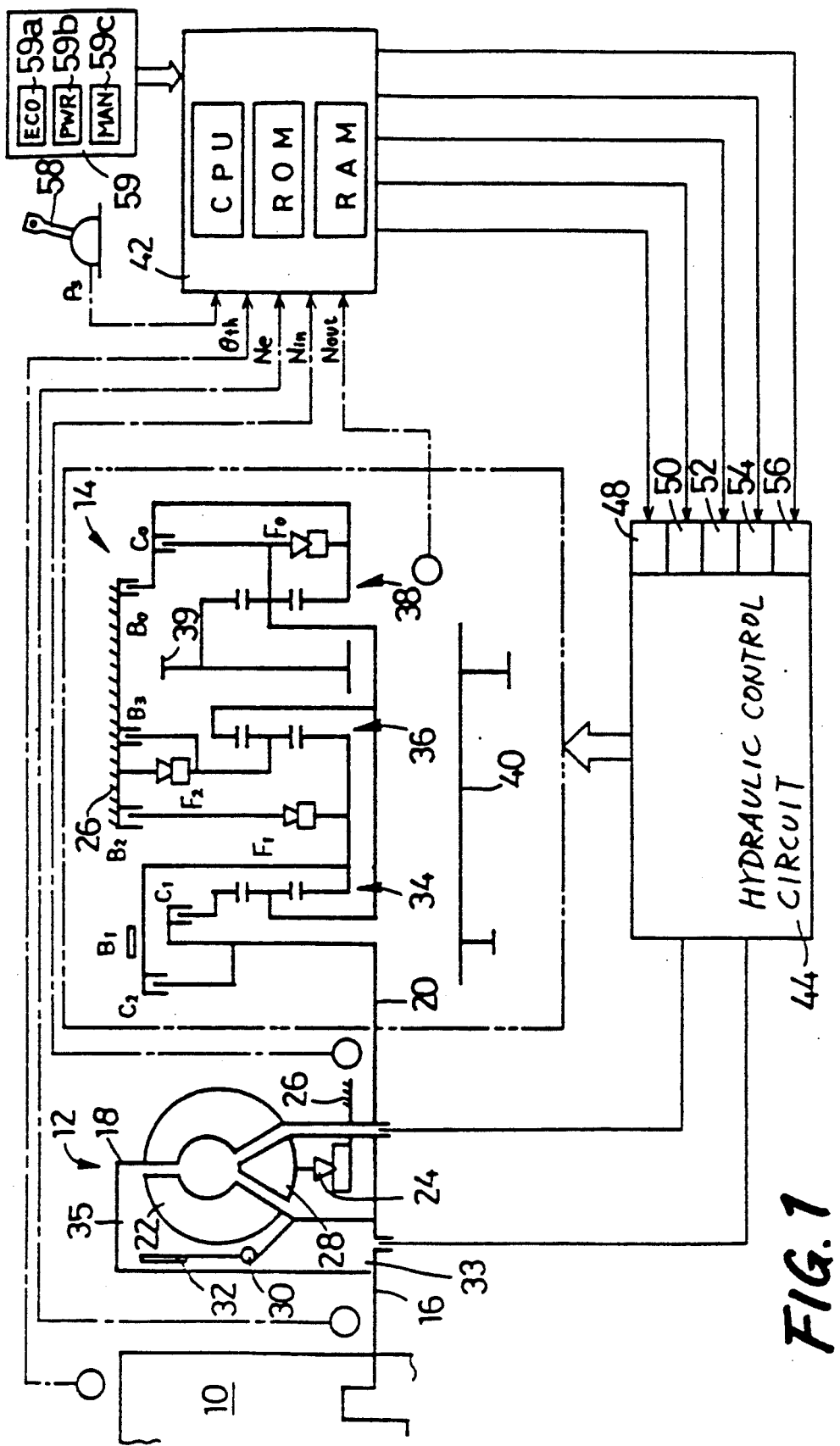
FIG. 1 is a schematic view of an automatic transmission of a motor vehicle and a hydraulic control apparatus therefor constructed according to a first embodiment of this invention.

Referring first to FIG. 1, reference numeral 14 denotes an automatic transmission of a motor vehicle, which receives power of an engine 10 through a torque converter 12. The power transmitted through the transmission 14 is transmitted to drive wheels of the vehicle via a differential gear device, and other components of a power transmitting system of the vehicle. The torque converter 12 incorporates a lock-up clutch 32, and the transmission 14 uses three planetary gear units 34, 36 and 38 which will be described.

The torque converter 12 includes: a pump impeller 18 connected to a crankshaft 16 of the engine 10; a turbine impeller 22 which is fixed to an input shaft 20 of the transmission 14 and which is rotated by the pump impeller via a fluid; a stator 28 fixed via a one-way clutch 24 to a stationary member in the form of a housing 26; and the above-indicated lock-up clutch 32 connected to the input shaft 20 via a damper 30. The lock-up clutch 32 has a releasing fluid chamber 33 and an engaging fluid chamber 35. When the fluid pressure in the releasing fluid chamber 33 is made higher than that in the engaging fluid chamber 35, the lock-up clutch 32 is disengaged, the output torque of the torque converter 12 is amplified at a ratio corresponding to a ratio of the input speed to the output speed. When the pressure in the engaging fluid chamber 35 is made higher than that in the releasing fluid chamber 33, on the other hand, the lock-up clutch is engaged, whereby the input and output members of the torque converter 12 are directly connected to each other, that is, the crankshaft 16 is directly connected to the input shaft 20 of the transmission 14.

The first, second and third planetary gear sets 34, 36, 38 of the transmission 14 are single-pinion type planetary gear sets which are disposed coaxially with each other such that the input shaft 20 is connected to the first set 34. The automatic transmission 14 further includes an output gear 39 which rotates with the ring gear of the third planetary gear set 38, and an output shaft in the form of a countershaft 40 for power transmission between the output gear 39 and the differential gear device indicated above. Some of the components of the planetary gear sets 34, 36, 38 are fixed together or integrally formed, while some of the components are selectively connected to each other through three clutches C0, C1 and C2. Further, some of the components of the gear sets 34, 36, 38 are selectively fixed to the housing 26 through four brakes B0, B1, B2 and B3, and some of the other components are coupled to each other or fixed to the housing 26 through three one-way clutches F0, F1 and F2, depending upon the direction of rotation of the components concerned.

In FIG. 1, the lower half of the torque converter 12 and automatic transmission 14 with respect to an extension line of the axis of the input shaft 20, and the upper half of the countershaft 40 with respect to its axis are not shown in the interest of brevity, since the torque converter 12 and the transmission 14 are both symmetrical with respect to the their axes.

For example, the clutches C0–C2 are multiple-disk clutches, while the brakes B0–B3 are band brakes, each having single band or two bands, as well known in the art. These clutches and brakes, and hydraulic actuators for operating these clutches and brakes constitute hydraulically operated frictional coupling devices, which are selectively activated by an electronic control device 42, so as to selectively establish four forward drive positions and one reverse drive position (R), which have different speed reduction ratios (I=Nin/Nout, where Nin represents the speed of the input shaft 20 (which is equal to a speed Nt of the turbine impeller 22), while Nout represents the speed of the countershaft 40. The four forward drive positions consist of a first-speed position (1st), a second-speed position (2nd), a third-speed position (3rd), and an overdrive position (O/D), whose speed reduction ratios I decrease in the order of description. As indicated in the table of FIG. 2, the four forward drive positions (1st), (2nd), (3rd) and (O/D) are available when a shift lever 58 of the vehicle is placed in a drive position (D), and the three forward drive positions (1st), (2nd) and (3rd) are available when the shift lever 58 is placed in a second position S). When the shift lever 58 is placed in a low position (L), only the two forward drive positions (1st) and (2nd) are available. As also indicated in the table of FIG. 2, the four forward drive positions are selected by respective four combinations of operating states of solenoids No. 1 and No. 2 of first and second solenoid-operated valves 48 and 50 (which will be described). In the table, "o" and "x" marks represent the energized (ON) and de-energized (OFF) states of the solenoids, respectively.

The electronic control device 42 is a microcomputer incorporating a central processing unit (CPU), a read-only memory (ROM), a random-access memory (RAM), and input and output interfaces. The control device 42 performs various control routines such as a routine for automatically shifting the automatic transmission 14, a routine for regulating the back pressures of accumulators $A_{C1}$, $A_{C2}$, $A_{B0}$ and $A_{B2}$ (which will be described), so as to reduce a shifting shock of the transmission 14, a routine for controlling the operating state of the lock-up clutch 32, and a routine for controlling the slip amount of the lock-up clutch 32.

The routine for automatically shifting the transmission 14 is effected on the basis of an opening angle $\theta$th of a throttle valve of the engine 10, a speed Ne of the engine 10 (a speed Np of the pump impeller 18), the speed Nin of the input shaft 20 (speed Nt of the turbine impeller 22), the speed Nout of the countershaft 40, and the currently selected position Ps of the shift lever 58.

The vehicle is provided with a mode selector panel 59 which provides three mode selector switches 59a, 59b, 59c. The mode selector switch 59a labelled ECO is for selecting a so-called "economy run" mode in which the transmission 14 is shifted according to a set of shift patterns formulated for running of the vehicle with relatively high fuel economy. The mode selector switch 59b labelled PWR is for selecting a so-called "power run" mode in which the transmission 14 is shifted according to a set of shift patterns formulated for powerful running of the vehicle with relatively high drivability. The mode selector switch 59c labelled MAN is for selecting a so-called "manual run" mode in which the transmission 14 is shifted according to a set of shift patterns formulated for running of the vehicle as if the vehicle was equipped with a manual transmission.

When the shift lever 58 is placed in the second position (S) while the mode selector switch 59c is in the operated position selecting the "manual run" mode, the vehicle is placed in a high-gear start mode in which the vehicle is started with the transmission 14 placed in the second-speed position (2nd) whose speed reduction ratio I is lower than that of the first-speed position (1st).

However, the vehicle may be started with the transmission 14 placed in the third-speed or other higher-gear position whose speed ratio I is lower than that of the first-speed position. Thus, the shift lever 58 and the mode selector switch 59c cooperate to function as means for selecting the high-gear start mode in which the vehicle is started with the transmission 14 placed in a higher-gear position whose speed ratio I is lower than that of the first-speed position (1st).

Figure 3:
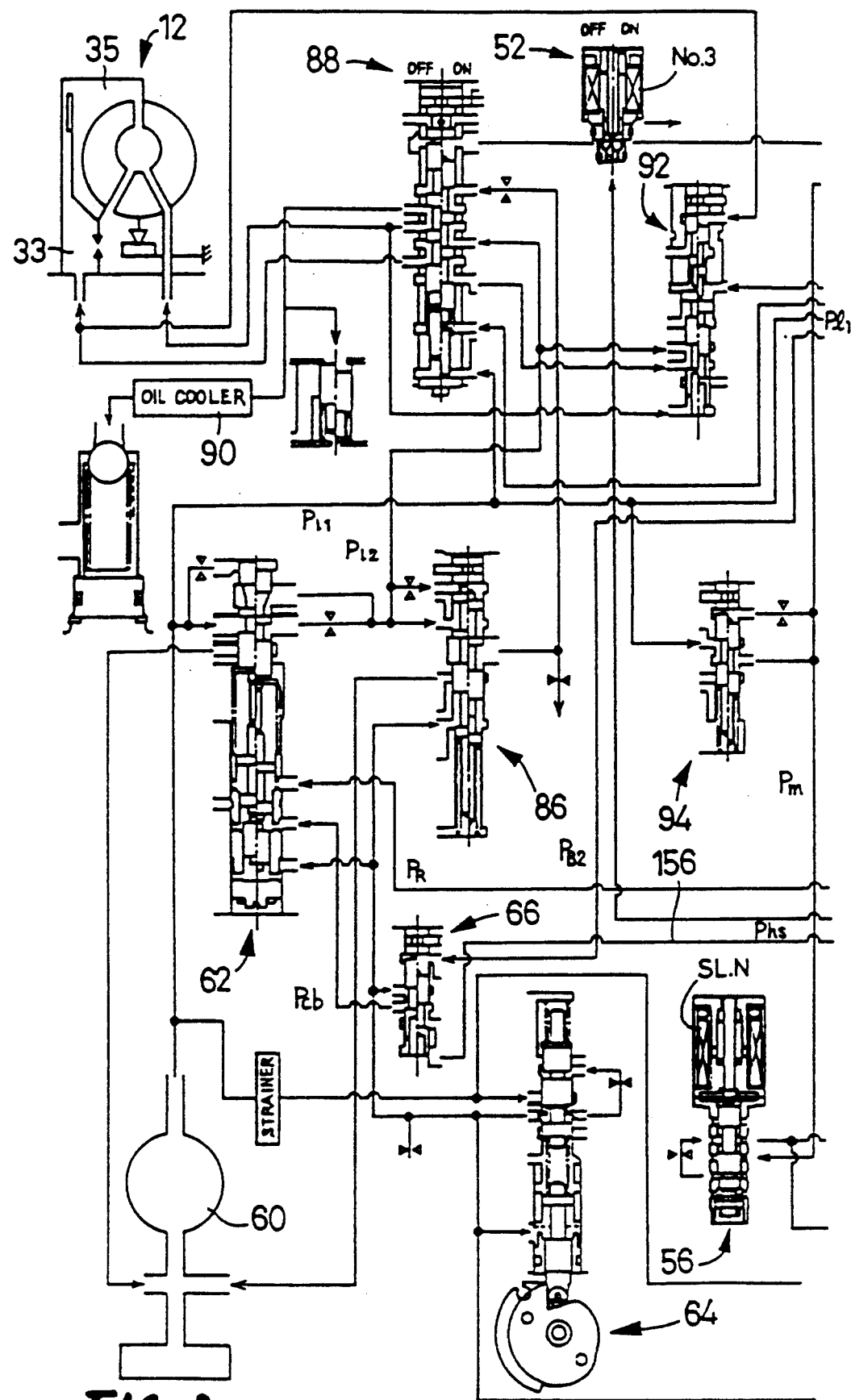
FIGS. 3-5 are diagrams showing a hydraulic control circuit for controlling the transmission.
Figure 4:
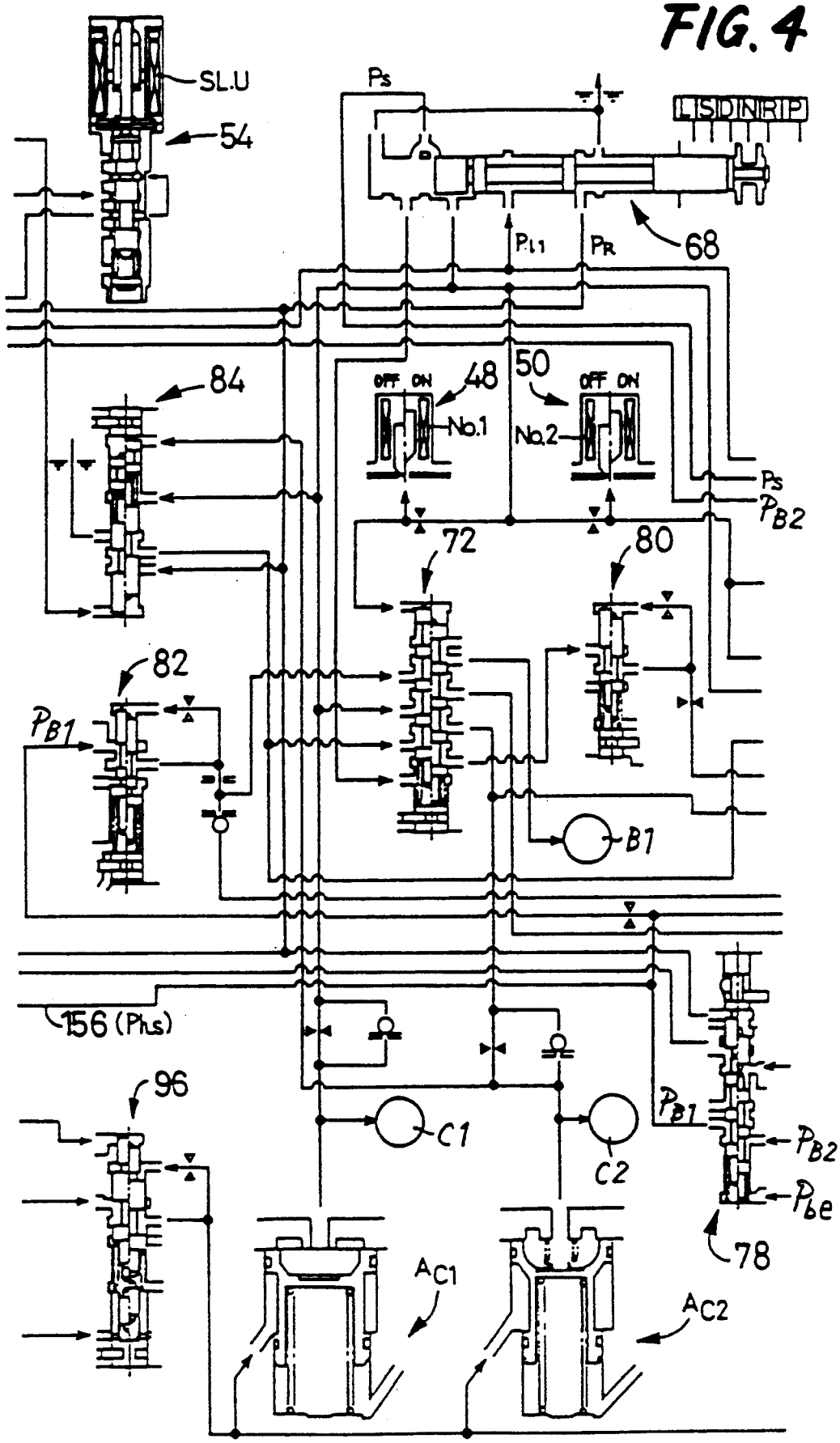
Figure 5:
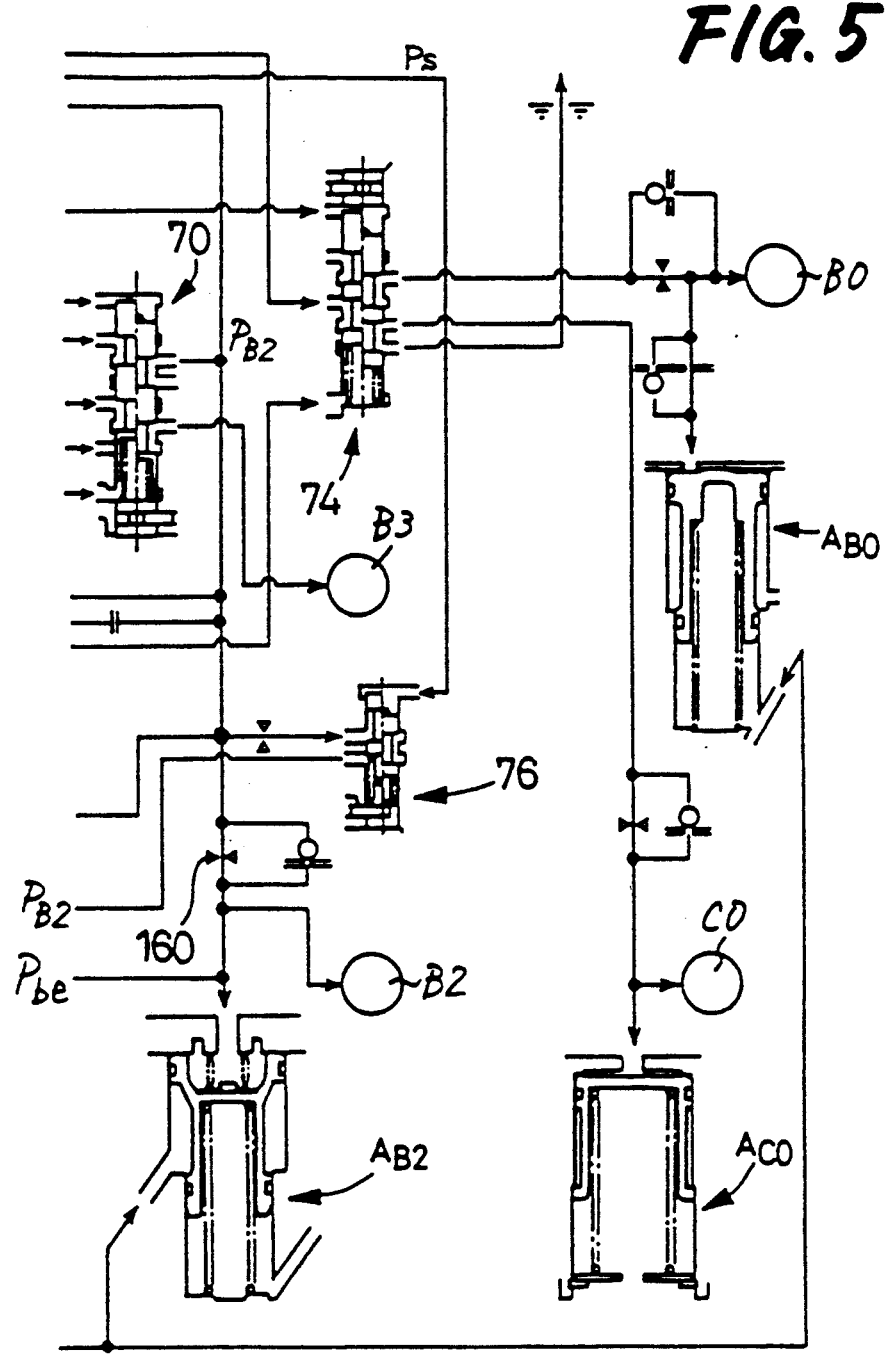

As indicated in FIG. 1, the electronic control device 42 controls the automatic transmission 14 and the lock-up clutch 14, through a hydraulic control circuit 44 which is shown in detail in FIGS. 3, 4 and 5. The hydraulic control circuit 44 is provided with first solenoid-operated valve 48 having a solenoid No. 1 and a second solenoid-operated valve 50 having a solenoid No. 2, as shown in FIG. 4. As described above, the four combinations of the operating states of these two solenoids No. 1 and No. 2 are selectively established to selectively activate the clutches and brakes of the transmission 14, as indicated in FIG. 2, for automatically shifting the transmission 14 from one of the four forward drive positions (1st, 2nd, 3rd and O/D) to another position, according to the currently selected set of shift patterns which corresponds to the vehicle running mode selected by the mode selector switches 59a, 59b, 59c.

The hydraulic control circuit 44 is also provided with a third solenoid-operated valve 52 having a solenoid No. 3 shown in FIG. 3, a first linear solenoid valve 54 having a linear solenoid SL.U shown in FIG. 4, and a second linear solenoid valve 56 having a linear solenoid SL.N shown in FIG. 3. The third solenoid-operated valve 52 functions to selectively place the lock-up clutch 32 in the engaged or released state. The first linear solenoid valve 54 functions to control the amount of slip of the lock-up clutch 32 while the clutch 32 is partially engaged. The second linear solenoid 56 functions to regulate the back pressures of the accumulators $A_{C1}$ and $A_{C2}$ (FIG. 4) for the clutches C1 and C2, respectively, and the back pressures of the accumulators $A_{B0}$ and $A_{B2}$ (FIG. 5) for the brakes B0 and B2, respectively.

Referring to FIGS. 3, 4 and 5, a pressurized working fluid for operating the transmission 14 and lock-up clutch 32 is delivered from an oil pump 60. The pressure of the fluid as delivered from the pump 60 is regulated into a first line pressure Pl1 by a first pressure regulating valve 62, which operates on the basis of a THROTTLE pressure Pth received from a throttle detecting valve 64, a CUT-BACK pressure Pcb received from a cut-back valve 66, and a REVERSE pressure $P_R$ received from a manual valve 68. The first line pressure Pl1 is used to applied to the hydraulic actuators for the clutches C0, C1, C2 and brakes B0, B1, B2 and B3, through the manual valve 68, a 1-2 shift valve 70 controlled by the second solenoid-operated valve 50, a 2-3 shift valve 72 controlled by the first solenoid-operated valve 48, a 3-4 shift valve 74, a S-shift valve 76, a B1 orifice control valve 78, a first coast modulator valve 80, a second coast modulator valve 82, etc. A reverse control valve 84 is provided to operate the 1-2 shift valve 70 and 2-3 shift valve 72 for releasing the clutch C2 and brake B3, to prevent the transmission 14 from being shifted to the reverse position (R), in the event of erroneous operation of the shift lever 58 to the reverse position (R) while the vehicle is running in the forward direction.

The pressure of the fluid which flows from the first pressure regulating valve 62 is regulated into a second line pressure Pl2 by a second pressure regulating valve 86, which operates on the basis of the THROTTLE pressure Pth. The thus obtained second line pressure Pl2 is applied to a lock-up clutch switching valve 88 for operating the lock-up clutch 32. As indicated in FIG. 3, the lock-up clutch switching valve 88 has an OFF position and an ON position for releasing and engaging the lock-up clutch 32, respectively. In the OFF position, the second line pressure Pl2 is applied to the releasing fluid chamber 33 while the fluid in the engaging fluid chamber 35 is discharged to a drain through an oil cooler 90. In the ON position, the second line pressure Pl2 is applied to the engaging fluid chamber 35 while the fluid in the releasing fluid chamber 33 is discharged to a drain through a slip control valve 92.

The slip control valve 92 is for controlling the amount of slip of the lock-up clutch 32, during a shift action of the transmission 14 so as to reduce the shifting shock of the transmission 14, or during partial engagement of the lock-up clutch so as to improve the fuel economy of the engine 10. To control the amount of slip of the lock-up clutch 32, the slip control valve 92 suitably regulates a difference between the pressures in the releasing and engaging fluid chambers 33 and 35, in response to a pilot pressure received from the linear solenoid valve 54.

A solenoid modulator valve 94 is provided as shown in FIG. 3, to regulate the first line pressure Pl1 to a suitable modulator pressure Pm, which is applied to the linear solenoid valves 54, 56. The modulator pressure Pm is also applied to the B1 orifice control valve 78 through the third solenoid-operated valve 52. As shown in FIG. 4, an accumulator control valve 96 is provided to regulate the first line pressure Pl1 to a back pressure Pb, in response to a pilot pressure received from the linear solenoid valve 56. The back pressure Pb is applied to the back pressure chambers of the accumulators $A_{C1}$, $A_{C2}$, $A_{B0}$ and $A_{B2}$.

Figure 6:
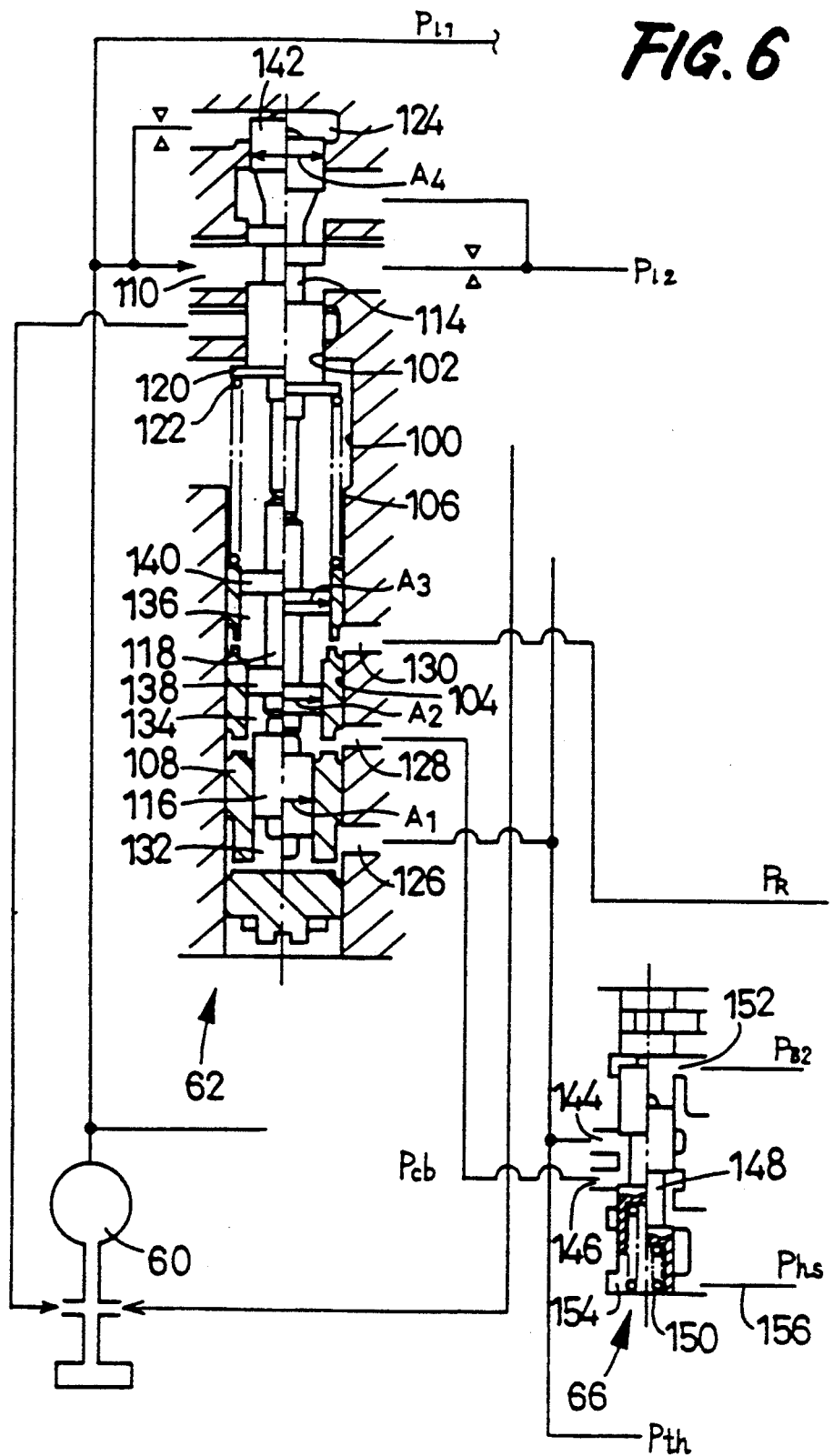
FIG. 6 is an enlarged elevational view in cross section of a first pressure regulating valve and a cut-back valve provided in the hydraulic control circuit.

As shown in detail in the enlarged view of FIG. 6, the first pressure regulating valve 62 has: a valve body 106 having a small-diameter hole 102, a large-diameter hole 104, and a cutout 100 formed between the two holes 102, 104; a sleeve member 108 axially slidably received in the large-diameter hole 104; a spool 114 received in the small-diameter hole 102, axially slidably between an open position for fluid communication between a supply port 110 and a relief port 112, and a closed position for disconnection of these ports 110, 112 from each other; a first plunger 116 and a second plunger 118; and a spring 122 interposed between a spring seat 120 provided on the spool 114, and the end of the sleeve member 108, so as to bias the spool 114 toward its closed position in which the supply and relief ports 110, 112 are disconnected from each other. The valve body 106 also has a FEEDBACK fluid chamber 124 which receives the first line pressure Pl1 to bias the spool 114 toward its open position in which the two ports 110, 112 communicate with each other. The valve body 106 further has a THROTTLE PRESSURE port 126 receiving the THROTTLE pressure Pth, a CUT-BACK PRESSURE port 128 receiving the CUT-BACK pressure Pcb, and a REVERSE PRESSURE port 130 receiving the REVERSE pressure $P_R$. The sleeve member 108 has a THROTTLE PRESSURE chamber 132, a CUT-BACK PRESSURE chamber 134 and a REVERSE PRESSURE chamber 136, which communicate with the ports 126, 128 and 130, respectively. The THROTTLE pressure Pth, which is generated by the throttle detecting valve 64, changes with the opening angle θth of the throttle valve of the engine 10. The REVERSE pressure $P_R$ is generated by the manual valve 68 when the shift lever 58 is operated to the reverse position (R).

The spool 122 is operated according to the following equation:

$$Pl1 = [Pth \cdot A1 + Pcb \cdot A2 + P_R(A5 - A2) + W]/A4$$

where,

A1: cross sectional area of the first plunger 116,
A2: cross sectional area of a first land 138 of the second plunger 118,
A3: cross sectional area of a second land 140 of the second plunger 118,
A4: cross sectional area of a first land 142 of the spool 114,
W: biasing force of the spring 122.

In other words, the first pressure regulating valve 62 regulates the first line pressure Pl1 according to the above equation. It will be understood from the equation that the first line pressure Pl1 increases with an increase in the throttle opening θth, namely, with an increase in the output torque of the engine 10. It will also be understood that the first line pressure Pl1 is increased by a predetermined amount, namely, raised to a higher level from the normal level, when the shift lever 58 is operated to the reverse position (R), or when the valve 62 receives the CUT-BACK pressure Pcb from the cut-back valve 66, with the shift lever 58 placed in the second position (S) or low position (L). The normal level is the level which is determined by the throttle opening θth.

As shown in FIG. 6, the cut-back valve 66 has: a supply port 144 receiving the THROTTLE pressure Pth; an output port 146 from which the CUT-BACK pressure Pcb is generated; a spool 148 axially movable between an open position (first position) for fluid communication between the ports 144 and 146, and a closed position (second position) for disconnection of these ports 144, 146 from each other; a spring 150 for biasing the spool 148 toward the open position; a fluid chamber 152 receiving a B2 pressure $P_{B2}$ of the fluid to be applied to the hydraulic actuator for the brake B2, for biasing the spool 148 toward the closed position; and a fluid chamber 154 which accommodates the spring 150 and which receives a HIGH-GEAR START pressure Phs supplied through a fluid passage 156, to bias the spool 148 toward the open position.

The spool 148 of the cut-back valve 66 is placed in the open or first position (the position of the left half of the spool 148 as shown in FIG. 6) when no pressures are applied to the fluid chambers 152 and 154.

When only the B2 pressure $P_{B2}$ is applied to the fluid chamber 152, the spool 148 is moved against the biasing force of the spring 150, to the closed or second position (the position of the right half of the spool 148 as shown in FIG. 6).

When the B2 pressure $P_{B2}$ and the HIGH-GEAR START pressure Phs are applied to the fluid chambers 152 and 154, respectively, the spool 148 is moved under the biasing force of the spring 150, to the open or first position. In this embodiment, the fluid passage 156 functions as part of means for applying the HIGH-GEAR START pressure Phs to the fluid chamber 154 of the cut-back valve 66, to thereby place the spool 148 in the first position.

The HIGH-GEAR START pressure Phs is generated in response to the shifting of the automatic transmission 14 to the second-speed position (2nd) when the high-gear start mode is established, namely, when the shift lever 58 is shifted to the second position (S) while the mode selector switch 59c is in the operated state. More specifically, a B1 pressure $P_{B1}$ which is generated from the B1 orifice control valve 78 and which is applied to the second coast modulator valve 82 is utilized as the HIGH-GEAR START pressure Phs, which is applied to the fluid chamber 154 of the cut-back valve 66 through the passage 156 to bring the cut-back valve 66 to the first position. The second coast modulator valve 82 which receives the B1 pressure $P_{B1}$ functions to lower the B1 pressure $P_{B1}$ to a pressure to be applied to the brake B1, so that the brake B1 is slowly engaged. The B1 pressure $P_{B1}$ is generated from the B1 orifice control valve 78, based on the B2 pressure $P_{B2}$ which the valve 78 receives from the S-shift valve 76 when the SECOND POSITION pressure Ps is applied to the valve 76. The B2 pressure $P_{B2}$ is produced from the 1–2 shift valve 70 when the solenoid No. 2 of the second solenoid-operated valve 50 is in the energized (ON) position to shift the transmission 14 to the second-speed position (2nd) as indicated in FIG. 2. However, the B1 orifice control valve 78 does not generate the B1 pressure $P_{B1}$ as soon as the valve 78 has received the B2 pressure $P_{B2}$ from the S-shift valve 76. More specifically, the B1 orifice control valve 78 receives a pilot pressure in the form of a brake engagement pressure Pbe from a point in a hydraulic line downstream of a flow restrictor 160 through which the B2 pressure $P_{B2}$ from the 1–2 shift valve 70 is applied to the brake B2 and accumulator $A_{B2}$. In the presence of delay means in the form of the flow restrictor 160, the brake engagement pressure Pbe gradually rises, and eventually reaches the level of the B2 pressure $P_{B2}$, or the pressure difference across the flow restrictor 160 is eventually zeroed. That is, the B1 pressure $P_{B1}$ utilized as the HIGH-GEAR START pressure Phs is generated when the brake B2 is completely engaged to shift the transmission 14 from the first-speed position (1st) to the 2nd-speed position (2nd) while the SECOND POSITION pressure Ps is generated, namely, while the shift lever 58 is placed in the second position (S). Thus, the HIGH-GEAR START pressure Phs and the B2 pressure $P_{B2}$ are applied to the cut-back valve 66 to place the cut-back valve 66 in the first position for raising the first line pressure Pl1 to the higher level, when the transmission 14 is shifted to the second-speed position (2nd) in the high-gear start mode, with the shift lever 58 placed in the second position (S) and with the mode selector switch 59c placed in the operated position.

When the transmission (14) is placed in the first-speed position (1st) with the shift lever 58 placed in the drive position (D), the solenoid No. 2 of the second solenoid-operated valve 50 is in the OFF position, as indicated in FIG. 2, and therefore the B2 pressure $P_{B2}$ is not generated from the 1–2 shift valve 70. Consequently, neither the B2 pressure $P_{B2}$ nor the HIGH-GEAR START pressure Phs are applied to the respective ports 152, 154 of the cut-back valve 66. Thus, the first line pressure Pl1 is also raised to the higher level, when the transmission 14 is shifted to the first-speed position (1st) while the shift lever 58 is placed in the drive position (D).

In the present embodiment, the solenoid-operated valve 50, manual valve 68, 1-2 shift valve 70, S-shift valve 76, B1 orifice control valve 78 and flow restrictor 160 cooperate to constitute means for generating the B1 pressure as the HIGH-GEAR START pressure Phs. This pressure generating means cooperates with the passage 156 to constitute the means for applying the HIGH-GEAR START pressure Phs to the cut-back valve 66.

As described above, the HIGH-GEAR START pressure Phs is applied to the fluid chamber 154 of the cut-back valve 66 through the passage 156, to place the cut-back valve 66 in the first or open position, when the transmission 14 is shifted to the second-speed position (2nd) while the high-gear start mode is selected. As a result, the CUT-BACK pressure Pcb is applied from the cut-back valve 66 to the CUT-BACK PRESSURE chamber 134 of the first pressure regulating valve 62. Consequently, the first line pressure Pl1 used for the second-speed position (2nd) in the high-gear start mode is increased by a predetermined amount from the normal level which is used in the normal running mode. In other words, the first line pressure Pl1 used for the second-speed position (2nd) in the high-gear start mode with the shift lever 58 placed in the second position (S) and the mode selector switch 59c placed in the operated position is made equal to the higher level for the first-speed position in the normal running mode (normal start mode), e.g., in the "economy run" mode with the mode selector switch 59a placed in the operated position with the shift lever 58 placed in the drive position (D).

Further, the present embodiment is effective to reduce the shifting shock upon shifting of the transmission 14 from the first-speed position (1st) to the second-speed position (2nd) in the normal running mode with the shift lever 58 placed in the second position (S). Described in detail, the spool 66 of the cut-back valve 66 is placed in the open position by the biasing force of the spring 150 when the vehicle is started in the first-speed position (1st). In this condition in which the first-speed position (1st) is established, the first line pressure Pl1 is made higher by the predetermined amount. When the transmission 14 is shifted from the first-speed position (1st) to the second-speed position (2nd) with the shift lever 58 in the second position (S), the B2 pressure $P_{B2}$ generated from the 1-2 shift valve 70 is first applied to the fluid chamber 152 of the cut-back valve 66, whereby the spool 148 is moved to the closed or second portion to thereby lower the first line pressure Pl1 to the normal level determined solely by the throttle opening θth. When the brake B2 is completely engaged a short time after the movement of the spool 148 to the closed position, the B1 pressure $P_{B1}$ is generated from the B1 orifice control valve 78 as described above, and is applied as the HIGH-GEAR START pressure Phs to the fluid chamber 154 through the passage 156, whereby the spool 148 is moved to the open or first position again, to increase the first line pressure Pl1 to the higher level. Thus, the first line pressure Pl1 is temporarily lowered to the normal level before it is eventually raised to the higher level, when the transmission 14 is shifted to the second-speed position (2nd) in the normal running mode with the shift lever 58 placed in the second position (S). Accordingly, the transmission 14 does not suffer from a shifting shock during this shifting operation.

It will be understood that the flow restrictor 160 functions as delay means for delaying the application of the high-gear start pressure Phs (B1 brake pressure $P_{B1}$) to the cut-back valve 66, with respect to the application of the B2 brake pressure $P_{B2}$, in order to temporarily lower the line pressure Pl1 during shifting of the transmission 14 from the first-speed position (1st) to the second-speed position (2nd) in the normal running of the vehicle with the shift lever 58 placed in the second position (S).

While the present invention has been described in its presently preferred embodiment, it is to be understood that the invention is not limited to the details of the illustrated embodiment, but may be otherwise embodied.

In the illustrated embodiment, the spool 148 of the cut-back valve 66 has the first or open position in which the CUT-BACK pressure Pcb is applied to the fluid chamber 134, and the second or closed position in which the pressure Pcb is not applied to the CUT-BACK PRESSURE fluid chamber 134. However, the cut-back valve 66 may be modified to have a first position in which the THROTTLE pressure Pth to be applied to the THROTTLE PRESSURE fluid chamber 132 is increased by a predetermined amount, and a second position in which the THROTTLE pressure Pth is not increased. In this case, the throttle detecting valve 64 is provided with a second feedback fluid chamber which receives the THROTTLE pressure Pth. In the first position, the cut-back valve causes the second feedback fluid chamber to communicate with the atmosphere. In the second position, the cut-back valve permits the second feedback pressure Pth to receive the THROTTLE pressure Pth.

Although the THROTTLE pressure Pth is used by the cut-back valve 66 to generate the CUT-BACK pressure Pcb, the other pressure such as the second line pressure Pl2 may be used.

It will be understood that the invention may be embodied with various other changes, modifications and improvements, which may occur to those skilled in the art, without departing from the spirit and scope of the invention defined in the following claims.

What is claimed is:

1. A hydraulic control apparatus for an automatic transmission of a motor vehicle having a plurality of hydraulically operated frictional coupling devices for selectively establishing a first-speed position and at least one higher-speed position whose speed reduction ratio is lower than that of said first-speed position, the apparatus comprising:

a pressure regulating valve for regulating a line pressure of a working fluid to be applied to the hydraulically operated frictional coupling devices;

a cut-back valve having a first position selected when the transmission is placed in said first-speed position, and a second position selected when the transmission is placed in any one of said at least one higher-gear position, said cut-back valve when placed in said first position causing said pressure regulating valve to raise said line pressure by a predetermined amount to a higher level than a normal level as normally established by said pressure regulating valve, said cut-back valve when placed in said second position causing said pressure regulating valve to regulate said line pressure to said normal level;

mode selecting means for selecting a high-gear start mode in which the vehicle is started with said automatic transmission placed in a predetermined one of said at least one higher-gear position; and pressure applying means, responsive to said mode selecting means, for applying to said cut-back valve a first and a second pressure to be applied to respective two coupling devices of said plurality of frictional coupling devices to establish said predetermined one higher-gear position, for placing said cut-back valve in said first position to raise said line pressure to said higher level, said pressure applying means comprising first pressure applying means for applying said first pressure as a high-gear start pressure to said cut-back valve, and second pressure applying means for applying said second pressure to said cut-back valve, said first pressure applying means including delay means for delaying the application of said first pressure to said cut-back valve, with respect to the application of said second pressure, for first applying only said second pressure to said cut-back valve to place said cut-back valve in said second position for lowering the line pressure from said higher level to said normal level, and then also applying said high-gear start pressure to said cut-back valve to place said cut-back valve in said first position for raising said line pressure to said higher level.

2. A hydraulic control apparatus according to claim 1, wherein said predetermined higher-gear position is a second-speed position whose speed reduction ratio is next lower than that of said first-speed position.

3. A hydraulic control apparatus according to claim 1, wherein said mode selecting means comprises a shift lever having a drive position and a second position, and said at least one higher-gear position consists of a plurality of higher-gear positions which are automatically selectable when said shift lever is placed in said drive position, at least one of said plurality of higher-gear positions which includes a higher-gear position whose speed reduction ratio is next lower than that of said first-speed position being automatically selectable when said shift lever is placed in said second position, said higher-gear start mode being selected when said shift lever is placed in said second position.

4. A hydraulic control apparatus according to claim 3, wherein said predetermined higher-gear position is said higher-gear position whose speed reduction ratio is next lower than that of said first-speed position.

5. A hydraulic control apparatus according to claim 3, wherein said mode selecting means further comprises a mode selector switch which is operated to select said high-gear start mode while said shift lever is placed in said second position, said transmission being shifted to said predetermined higher-gear position when said mode selector switch is operated while said shift lever is placed in said second position.

6. A hydraulic control apparatus according to claim 3, wherein said second pressure applying means of said pressure applying means includes pressure generating means for generating said second pressure to be applied to one of said two coupling devices, said pressure generating means including a manual valve which has a drive position and a second position which are selected when said shift lever are placed in said drive and second positions, respectively, said manual valve generating a second position pressure when said manual valve is placed in said second position thereof, said first pressure applying generating said first pressure as said high-gear start pressure based on said second position pressure.

7. A hydraulic control apparatus according to claim 6, wherein said pressure generating means further includes a solenoid-operated valve which is operated when said transmission is shifted to said predetermined higher-gear position, and said second pressure applying means further includes a shift valve for generating said second pressure when said solenoid-operated valve is operated, said first pressure applying means including a first control valve adapted to receive said second pressure from said shift valve and said second position pressure from said manual valve, said first pressure applying means generating said high-gear start pressure based on said second pressure when said first control valve receives said second position pressure.

8. A hydraulic control apparatus according to claim 7, wherein said first pressure applying means further includes a second control valve which receives a pilot pressure which rises to a level of said second pressure when said one of said two coupling devices is completely engaged, said second control valve also receiving said second pressure when said first control valve receives said second position pressure from said manual valve, said second control valve applying said high-gear start pressure (Phs) to said cut-back valve when said second control valve receives said second pressure and when said pilot pressure (Pbe) rises to the level of said second pressure.

9. A hydraulic control apparatus according to claim 8, wherein said delay means includes a flow restrictor disposed between said shift valve and said one of said frictional coupling devices, said pilot pressure is a pressure at a point downstream of said flow restrictor.

* * * * *